March 17, 1936.  W. E. JOHN  2,034,193
MOVING LENS CINEMATOGRAPH MACHINE
Filed Feb. 24, 1934
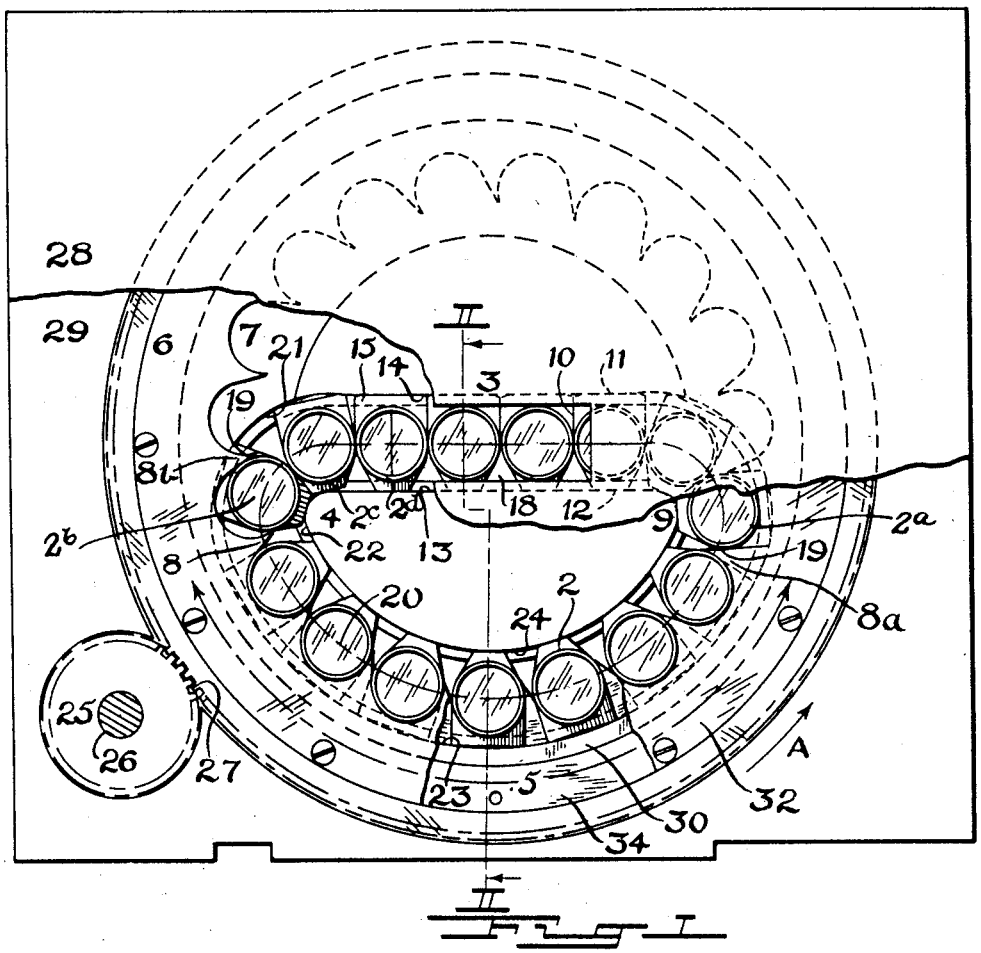
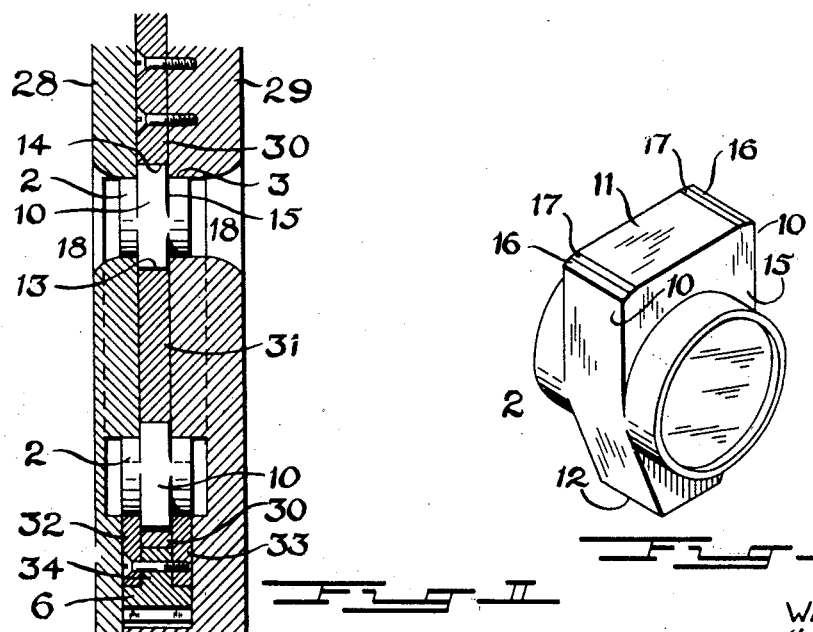
INVENTOR:
WESLEY ERNEST JOHN
BY Francis E. Boyce
ATTORNEY pattern# UNITED STATES PATENT OFFICE 2,034,193

MOVING LENS CINEMATOGRAPH MACHINE

Wesley Ernest John, Johannesburg, Transvaal, Union of South Africa

Application February 24, 1934, Serial No. 712,698

1 Claim. (Cl. 88—16.8)

The present invention relates to cinematograph apparatus for moving an endless train of loose lens carriers with a continuously moving film; and is illustrated in the accompanying drawing in which:

Figure I is an elevation with parts broken away;
Figure II is a section on II—II, Figure I; and
Figure III is a perspective view of a lens carrier.

The apparatus is of the general type described in United States specifications 1,768,772 and 1,822,528, in which an endless series of loose cylindrical lens carriers 2 is moved through a closed path consisting of a straight guide 3: The arcuate transition guide 4, at the outgoing end of the straight guide: the arc 5 of a rotating wheel 6 having internal pockets 7 for the carriers and teeth 8 between the pockets; and the arcuate transition guide 9 leading back to the straight guide 3.

The term "cylindrical" used above means that the carriers 2 are cylindrical at their points of contact with one another and with the teeth 8, to the extent necessary to allow them to roll on one another in the guides 4, 9 and to make cylindrical driving contact with the teeth 8. Otherwise the carriers may have any form; and, to avoid line bearing and rubbing contacts, they are in practice provided with flat pressure surfaces 10 by means of which they make contact with one another on the straight guide 3; and with flat slipper surfaces 11, 12 perpendicular to the surfaces 10, which slide on flat surfaces 13, 14 forming part of the straight guide 3. Said surfaces 10, 11, 12 may be provided on flanges 15 which retain the carriers against endwise movement and are formed with curved slipper surfaces 16, 17 hereafter referred to.

In the straight guide 3 the lens carriers move parallel with and at the same speed as a cinematograph film; both the lenses and the film being exposed through an aperture 18.

The wheel 6 constitutes the means for driving the train of carriers 2. As the wheel rotates in the direction of the arrow A, the ingoing transition guide 9 constrains each carrier 2 in turn to move out of its wheel pocket 7 and into said guide, into which it is driven by the wheel tooth 8a which is at the moment in contact with it. The carriers in the ingoing transition guide 9 and the straight guide 3 are all in cylindrical contact with one another and are moved by pushing one another. It is necessary that the linear velocity of the carriers in the straight guide 3 shall very exactly maintain a given relationship to the angular velocity of the wheel 6 so as to travel exactly with the moving film, the linear velocity of which is also maintained in a given relationship to the angular velocity of the wheel 6. For this purpose the driving face 19 of each tooth is made such that by engagement with the cylindrical surface of the carrier 2a it imparts to the bodies in the straight path the desired constant linear velocity relative to the angular velocity of the wheel 6.

It is further necessary to provide for the bodies to pass away from the straight guide 3 through the outgoing transition guide 4 and back into their proper wheel pockets 7 smoothly and without possibility of jamming. In this portion of the cycle their linear velocity has to be increased from that which they have in the straight guide 3 to the linear velocity of the pitch circle 20 of the wheel 6. In United States Patent 1,822,528 there is described for this purpose a star wheel which is driven by the contact with a tooth thereof of a carrier already seated in its wheel pocket, and other teeth of which drive and space out the carriers in the outgoing transition guide 4. This device, whilst ensuring that the carriers are properly marshalled into their wheel pockets and avoiding jamming of the bodies in the outgoing guide 4, has been found to accelerate the bodies somewhat too rapidly with the result that a clicking noise is produced which is undesirable in the case where sound is being recorded or projected. The principal object of the invention is to overcome this difficulty.

According to the invention, the carriers in the straight guide 3 and in both the transition guides 4, 9 are arranged to be in direct cylindrical contact with one another in a series including at one end the carrier 2a which is at any moment being driven into the ingoing guide 9 by the relevant wheel tooth 8a, and at the other end the carrier 2b in the outgoing guide 4 which has been engaged by its relevant wheel tooth 8b. In order that the bodies may be thus arranged without either jamming or slackness when in movement, it is essential that all the carriers of the limited series defined shall be maintained in true cylindrical contact with one another and that the flanges 15 shall be maintained exactly radial to the centres of the transition curves 4 and 9. For this purpose there is provided on each carrier the curved slipper surface 16 (preferably in two widely spaced portions at the ends of the flat slipper surface 11); which surface 16 and the flat surface 12 make contact respectively with outer and inner guide surfaces 21 and 22 which are continuations of the straight guide surfaces 13 and 14 and form parts of the transition guides 4 and 9. In order to carry out this arrangement without unnecessary complication, it is desirable to make the transition guides 4 and 9 uniform with one another in shape and size.

In order still further to guard against any departure from the radial position of the carriers in the transition guides, it has been found desirable to guide the carriers radially while they are in the wheel arc 5. With this object the guide surfaces 21 and 22 are continued around the arc 5 as the curved surfaces 23 and 24, and the further curved and divided slipper surface 17 is formed in the flange 15 to engage the surfaces 23 and 24.

With the carriers in contact from one wheel tooth to the other as described, their linear speed is positively accelerated without shock as they pass into the outgoing transition guide 4 owing to the obliquity of the path of the carrier 2c— which is being thrust into said guide—to the path of the carrier 2d which is in the straight guide and is thrusting it. Immediately such carrier 2c is engaged by the oncoming wheel tooth 8b it is further accelerated without shock by being compelled to slide under the inclined tooth face 19; so that it arrives at its final seating position in its pocket 7 with the same speed as said pocket. A similar but negative acceleration takes place as the carrier re-emerges at 2a from its pocket to pass first into guide 9 and then into guide 3.

In the case of cinematographic apparatus employed for three colour work it is essential that the aperture 18 through which the lenses are exposed shall be equal in length to three diameters of the lens carriers and that the straight guide 3 shall be of such length as to accommodate five carriers. It has been found by experiment and calculation that under these conditions and when the straight guide is substantially on a diameter of the wheel 6—as it should be to keep the size of the apparatus as small as possible—the minimum possible number of lens carriers in the system is fifteen. The invention accordingly further consists in the arrangement described, in which the straight guide 3 is substantially on a diameter of the wheel 6, said straight guide is long enough to accommodate five lens carriers, and the total number of lens carriers in the system is fifteen. In order to obtain the most favourable tooth form 19 under these conditions, the number of pockets 7 in the wheel 6 is made nineteen. With this data, coupled with the fact that it is desirable to make the pitch radii of both the transition curves 4 and 9 substantially equal to two radii of the carriers 2, the form of the wheel teeth 19 and the dimensions of all other essential elements of the system, can be arrived at without difficulty.

In the construction shown, the wheel 6 is driven by a toothed pinion 25 mounted on a driven shaft 26, and is for that purpose formed with external teeth 27. The mechanism is enclosed within a halved casing 28, 29, in which is formed the aperture 18. The wheel 6 is mounted to rotate upon the internal plates 30, 31 which provide the straight guide 3 between them. The wheel teeth 8 are formed on two rings 32, 33 fastened on an internal flange 34 of the wheel 6 so as to be on either side of said plates 30, 31.

I claim:

Apparatus for moving a series of lens carriers through a closed path comprising a continuous series of inside and outside guides between which the carriers slide, said guides consisting of a straight section, an arcuate section of relatively large radius and two transition sections of relatively small radius which join each end of the straight section with the large radius arcuate section, and a wheel with teeth and pockets by which the carriers are propelled, each carrier comprising a cylindrical surface by which it makes contact with other carriers and the teeth of said wheel; each carrier further comprising on one side a straight slipper surface which makes contact with the interior guide surfaces and comprising on the other sides a slipper surface consisting of a straight surface, at each end thereof an arcuate surface complementary to the outside guide of the large radius pair of guides and an arcuate surface complementary to the outside surface of the transition guides.

WESLEY ERNEST JOHN.